N. M. BAKER.
TUBULAR WASHER FOR EYEGLASSES.
APPLICATION FILED APR. 3, 1911.
1,005,766.
Patented Oct. 10, 1911.
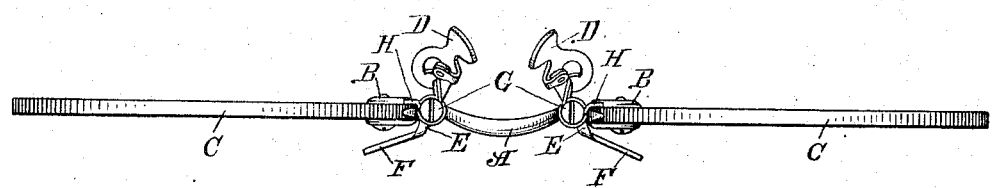
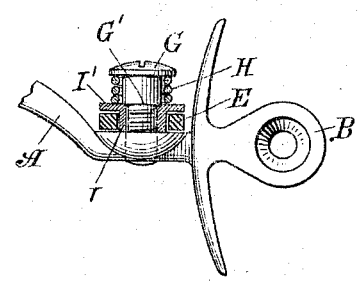
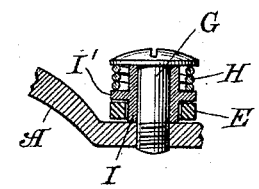
WITNESSES
INVENTOR
NELSON M. BAKER
BY
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

TUBULAR WASHER FOR EYEGLASSES.

1,005,766.     Specification of Letters Patent.     Patented Oct. 10, 1911.

Original application filed October 10, 1908, Serial No. 457,119. Divided and this application filed April 3, 1911. Serial No. 618,492.

*To all whom it may concern:*

Be it known that I, NELSON M. BAKER, a citizen of the United States, and a resident of Southbridge, county of Worcester, and State of Massachusetts, have invented certain new and useful Improvements in Tubular Washers for Eyeglasses, of which the following is a specification.

My invention relates to finger piece eyeglasses, provided with pivoted spring pressed nose clamps, and has for its object to provide an improved bearing for the finger piece which will be secure, durable in continuous use, easily and inexpensively replaced when it does wear unduly, and which will support the operating spring and prevent the same from bearing down upon the arm of the finger piece so as to increase its friction with the bridge of the eyeglasses.

Other incidental objects will appear as the specification proceeds.

This application is a division of a prior application filed by me October 10, 1908, Serial No. 457,119.

Referring to the drawings, Figure 1 is a plan view of a pair of eyeglasses of the type described, with my invention applied thereto; Fig. 2 is an enlarged section, taken through the axis of the pivot screw, showing one form of my invention; and Fig. 3 is a similar view showing a modified form of my invention.

In Figs. 1 and 2 the nosebridge A has lens clamps B secured to each of its ends and to these clamps are fastened the lenses C. Nose clamps D serve to maintain the glasses in position on the nose and are provided with arms E, which terminate in operating finger pieces F. Screws G extend into the nose bridge A and serve as axes about which the arms E (and nose clamps D) are movable, said arms being preferably perforated to receive the screws. A coil spring H surrounds each of said screws G, with its one end abutting against the lens clamp B and its other end in engagement with the nose clamp D. The tendency of this spring is to press the nose clamps D toward one another so that a pressure is exerted on the nose of the wearer for maintaining the glasses in position. To prevent the spring from bearing directly upon the arm E, I provide a tubular washer comprising a sleeve I having a flange I', said sleeve surrounding the screw G and extending through the arm E; the washer may be held in position by a shoulder G' suitably formed on the screw G. The arm E thus moves, between the upper surface of the nose bridge A and the lower surface of the flange I', upon the sleeve I. The spring H is held, as appears from the drawing, between the head of the screw G and the flange I' and does not bear upon the arm E, so that the friction of the latter upon its pivotal mounting as described is dependent only upon the quality of the mutually engaging surfaces. The pivotal action will also be smooth and even and free from wobble if said engaging surfaces are accurately and properly formed.

The construction shown in Fig. 3 differs from that just described only in that the sleeve I is continued above the flange I' to the head of screw G, the shank of said screw being made uniform throughout; the tubular washer in this case instead of being clamped between a shoulder on the pivot screw and the nose bridge A is clamped between the head of the screw and the nose bridge. The arrangement of the spring H, the operation and the advantages of this construction are practically the same as in the case of the construction shown by Fig. 2.

Various modifications may be made without departing from the scope of my invention as defined in the following claims:

1. In eyeglasses, the combination with the bridge of a tubular washer comprising a sleeve and a flange, a nose clamp having an arm perforated to receive said sleeve, one side of said flange being adapted to engage a side of said arm, a spring upon the other side of said flange, and means for attaching said washer to the bridge, substantially as and for the purpose described.

2. In eyeglasses, the combination with the bridge of a tubular washer comprising a sleeve and a flange, a nose clamp having an arm perforated to receive said sleeve, a screw provided with a head for attaching said washer to the bridge, and a spring surrounding said screw held between said screw head and said flange, substantially as and for the purpose described.

3. In eyeglasses, the combination with the bridge of a tubular washer comprising a sleeve and a flange, a nose clamp having an arm perforated to receive said sleeve, one side of said flange being adapted to engage a side of said arm, a screw for attaching said washer to the bridge said screw being provided with a shoulder adapted to engage the other side of said flange, and a spring separated by said flange from said arm, substantially as and for the purpose described.

4. In eyeglasses, the combination with the bridge of a tubular washer comprising a sleeve and a flange, a headed screw for attaching said washer to the bridge, a nose clamp having an arm pivoted upon said sleeve held between said flange and the bridge, and a spring between said flange and the screw head, substantially as and for the purpose described.

5. In eyeglasses of the type described having nose clamps each provided with a perforated arm, the combination of a tubular washer comprising a sleeve to engage said perforation and a flange at one end of said sleeve to engage a side of said arm, a screw for securing said washer to the bridge, and a spring surrounding said screw and separated from said arm by said flange, substantially as and for the purpose described.

In testimony whereof I have hereunto set my hand in the presence of two subscribing witnesses.

NELSON M. BAKER.

Witnesses:
ELMER G. WILLYOUNG,
HARRY H. STYLL.

---

Copies of this patent may be obtained for five cents each, by addressing the "Commissioner of Patents, Washington, D. C."

---